(12) United States Patent
Tsushima

(10) Patent No.: US 11,678,233 B2
(45) Date of Patent: Jun. 13, 2023

(54) INFORMATION PROCESSING APPARATUS, MOBILE OBJECT, COMPUTER-READABLE STORAGE MEDIUM, AND INFORMATION PROCESSING METHOD

(71) Applicant: HONDA MOTOR CO., LTD., Tokyo (JP)

(72) Inventor: Kosei Tsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/412,293

(22) Filed: Aug. 26, 2021

(65) Prior Publication Data

US 2022/0141724 A1 May 5, 2022

(30) Foreign Application Priority Data

Oct. 29, 2020 (JP) .............................. JP2020-181623

(51) Int. Cl.
*H04W 4/00* (2018.01)
*H04W 36/00* (2009.01)
(Continued)

(52) U.S. Cl.
CPC .. *H04W 36/0058* (2018.08); *B60W 30/18109* (2013.01); *H04B 17/318* (2015.01); *H04W 4/40* (2018.02); *H04W 36/0066* (2013.01)

(58) Field of Classification Search
CPC .. H04B 17/309; H04B 17/318; H04B 17/327; H04B 17/336; H04B 17/345;
(Continued)

(56) References Cited

U.S. PATENT DOCUMENTS

2016/0042101 A1 2/2016 Yoshida

FOREIGN PATENT DOCUMENTS

| JP | 6337881 B2 | 6/2018 |
| JP | 6390167 B2 | 9/2018 |
| JP | 6626415 B2 | 12/2019 |

OTHER PUBLICATIONS

NEC Corporation, "Video Feed Technology (Adaptive Video Feed Controlling Technology) Supporting Security, Rescue, and Disaster Prevention," accessed on Sep. 24, 2021, URL:https://jpn.nec.com/rd/tg/smc/research/adaptive_video_feed_control.html.

(Continued)

*Primary Examiner* — Matthew W Genack

(57) ABSTRACT

An information processing apparatus comprises a communication unit configured to communicate with an external device through a mobile communication network, and comprises: a throughput measuring unit; a throughput predicting unit configured to predict a future communication throughput; a communication rate controller; a band information acquiring unit; a communication environment information storage unit by associating; and a detection unit configured to detect at least one of a handover execution and a communication band switching, wherein if the detection unit has detected at least one of a handover execution and a communication band switching, the communication rate controller switches from controlling the communication rate based on a future communication throughput predicted by the throughput predicting unit to controlling the communication rate based on band information acquired by the communication environment information storage unit and the band information acquiring unit.

20 Claims, 6 Drawing Sheets

(51) Int. Cl.
*H04W 4/40* (2018.01)
*B60W 30/18* (2012.01)
*H04B 17/318* (2015.01)

(58) Field of Classification Search
CPC ..... H04B 17/373; H04B 17/382; H04W 4/40; H04W 4/41; H04W 4/44; H04W 4/46; H04W 4/48; H04W 4/50; H04W 28/02; H04W 28/0226; H04W 28/0231; H04W 28/0942; H04W 36/0011; H04W 36/0016; H04W 36/0058; H04W 36/0061; H04W 36/0066; H04W 36/0083
See application file for complete search history.

(56) References Cited

OTHER PUBLICATIONS

Hiroshi Yoshida et al., "Video Streaming Technology Supporting Public Safety," NEC Technical Journal, Sep. 2017, vol. 70, the first issue, p. 52-55.

| COMMUNICATION THROUGHPUT | BAND | SINR | RSRP | MOVING SPEED | LOCATION | CLOCK TIME |

FIG. 3

INFORMATION PROCESSING APPARATUS, MOBILE OBJECT, COMPUTER-READABLE STORAGE MEDIUM, AND INFORMATION PROCESSING METHOD

The contents of the following Japanese patent application are incorporated herein by reference: Japanese Patent Application
NO. 2020-181623 filed on Oct. 29, 2020.

BACKGROUND

1. Technical Field

The present invention relates to an information processing apparatus, a mobile object, a computer-readable storage medium, and an information processing method.

2. Related Art

Patent document 1 and Patent document 2 describe technology predicting time-series data for the future communication throughput based on time-series data for the communication throughput. Non-Patent Document 1 and Non-Patent Document 2 describe adaptive control technology for video streaming, avoiding the image quality deterioration caused by an excessive compression by controlling the compression rate and the number of frame on the basis of a predicted communication throughput. Patent Document 3 describes to request a test data from a server apparatus in response to the occurrence of a handover to calculate the throughput by using the size and receiving time of the test data.

PRIOR ART DOCUMENTS

Patent Document

[Patent Document 1] Japanese patent No. 6337881
[Patent Document 2] Japanese patent No. 6390167
[Patent Document 3] Japanese patent No. 6626415

Non-Patent Document

[Non-Patent Document 1] "Video Feed Technology (Adaptive Video Feed Controlling Technology) Supporting Security, Rescue, and Disaster Prevention," [online] NEC Corporation, [accessed 2021, Sep. 24], the Internet <URL: https://jpn.nec.com/rd/tg/smc/research/adaptive_video_feed_control.html>
[Non-Patent Document 2] Hiroshi Yoshida, 3 others, "Video Streaming Technology Supporting Public Safety," NEC Technical Journal, September, 2017, Vol. 70, the first issue, p. 52-55

BRIEF DESCRIPTION OF THE DRAWINGS

FIG. 3 shows the data structure of communication environment information stored in a communication environment information storage unit 280.

DESCRIPTION OF EXEMPLARY EMBODIMENTS

Hereinafter, the invention will be described through embodiments, but the following embodiments do not limit the invention according to the claims. In addition, not all of the combinations of features described in the embodiments are essential to the solving means of the invention.

Figure 1:
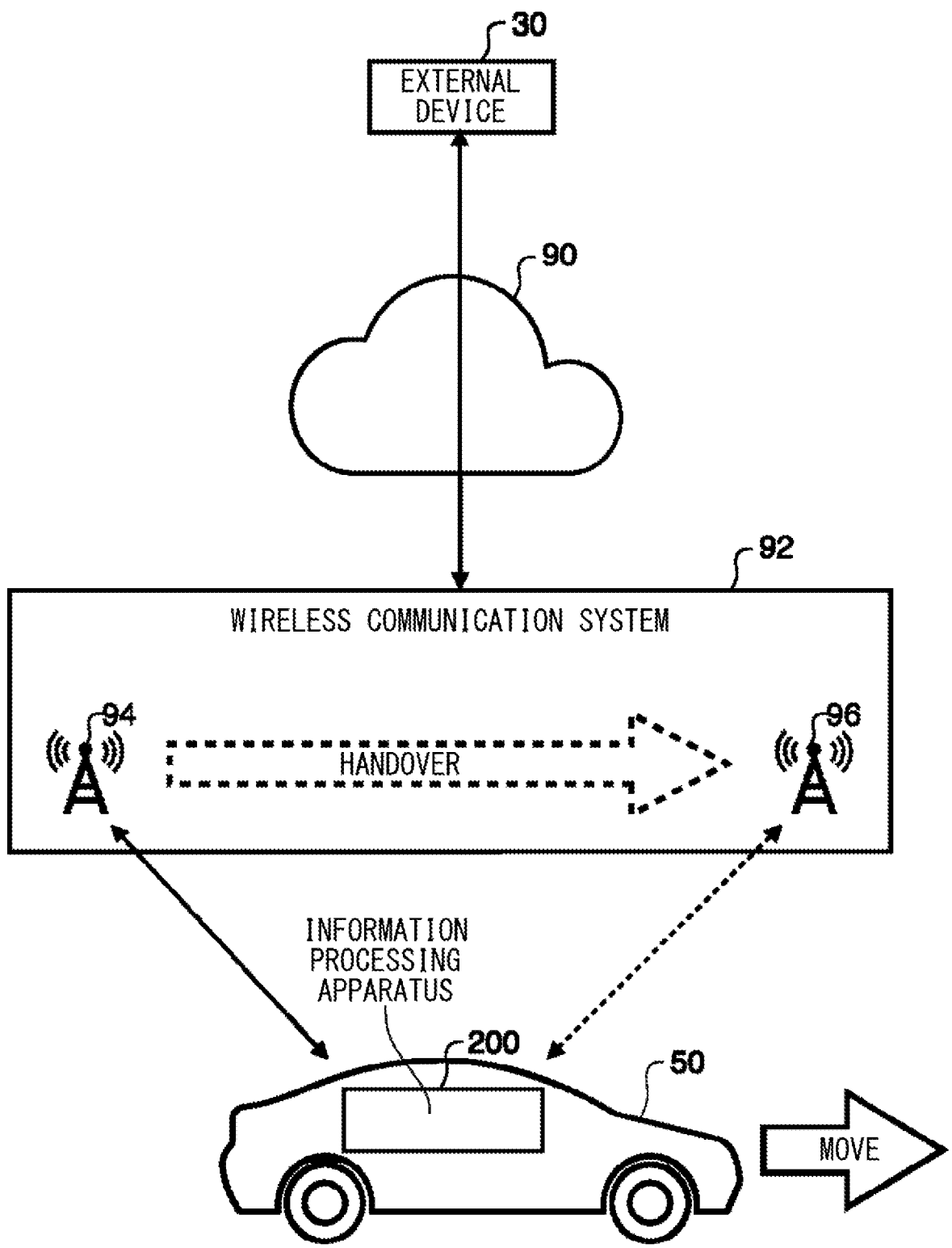
FIG. 1 schematically shows the utilization form of a vehicle 50 according to one embodiment.

FIG. 1 schematically shows the utilization form of a vehicle 50 according to one embodiment. For example, the vehicle 50 is a motor vehicle. The vehicle 50 may be a motor vehicle having an internal combustion engine, an electric vehicle, and a fuel-cell vehicle (FCV). The vehicle 50 is one example of transport equipment.

The vehicle 50 comprises an information processing apparatus 200. The information processing apparatus 200 performs data communication with an external device 30. The information processing apparatus 200 communicates with the external device 30 through a communication network 90, and a wireless communication system 92. The communication network 90 includes an IP network, a P2P network, a private line such as VPN, and virtual network of the Internet, for example. In the present embodiment, the wireless communication system 92 is the mobile communication network connected to the communication network 90. For example, the wireless communication system 92 includes a radio access network (RAN) including a mobile base station 94, a mobile base station 96 and a radio line control device, and a core network.

The external device 30 includes a server providing the occupant of the vehicle 50 with content data, for example. The external device 30 includes a server storing video image data, and a first server providing a SNS (social network service), for example. The information processing apparatus 200 receives video image data from the first server in response to the instruction from the occupant of the vehicle 50. The information processing apparatus 200 sends text information, voice information, image information, video information or the like, as SNS messages from the occupant of the vehicle 50, to the first server in response to the instruction from the occupant of the vehicle 50. The external device 30 also includes a second server providing a service related to control systems of the vehicle 50, for example. The second server may be a server collecting the control-system-related information of the vehicle 50, for example. The control-system-related information collected by the external device 30 can illustrate LIDAR data or the like used for automated driving of the vehicle 50. The second server may be a server providing the control-system-related information to the vehicle 50, for example. The control-system-related information provided by the second server may include map data used for automated driving of the vehicle 50.

In a case where the information processing apparatus 200 performs a mobile communication through the wireless communication system 92, the information processing apparatus 200 measures a communication throughput for communicating with the external device 30 to store as communication environment information in which the measured communication throughput and band information used for communicating with the base station 94 or the base station 96 are associated with each other. The band information is information identifying the frequency band used for communication, for example. Examples of the band information may include LTE band 1 (B1), band 3 (B3), and band 8 (B8), and 5G n41 and n42, for example.

In a situation where the information processing apparatus 200 is connected to the base station 94 as a mobile station in order to communicate with the external device 30 through the base station 94, the information processing apparatus 200 predicts a future communication throughput based on a communication throughput measured in the past. In this situation, the information processing apparatus 200 controls the communication rate for communicating with the external device 30 by using the predicted future communication throughput. For example, in a case where the future communication throughput is predicted to be low, the information processing apparatus 200 decreases the communication rate of content data between the information processing apparatus 200 and the first server. Thus, the information processing apparatus 200 can prevent the communication throughput of the control-system-related information between the information processing apparatus 200 and the second server from decreasing.

If a radio wave intensity of a communication signal received from the base station 94 decreases as the vehicle 50 drives, the information processing apparatus 200 executes a handover to the base station 96. In this occasion, the information processing apparatus 200 acquires a communication throughput associated with the band information to be used for communicating with the base station 96 being the destination of the handover, from communication environment information having been stored in the past. If the information processing apparatus 200 executes the handover to the base station 96, the information processing apparatus 200 switches from controlling the communication rate based on the past communication throughput to controlling the communication rate based on the communication throughput acquired from the communication environment information. For example, in a case where there is a switching from the wideband band to the narrowband band due to the handover, the information processing apparatus 200 decreases the communication rate of content data between the information processing apparatus 200 and the first server to prevent the communication throughput of the control-system-related information between the information processing apparatus 200 and the second server from decreasing. This can decrease the possibility of exceeding the communication rate when there is the switching from the wideband band to the narrowband band due to the handover, resulting in the communication being temporarily shut down, for example.

Figure 2:
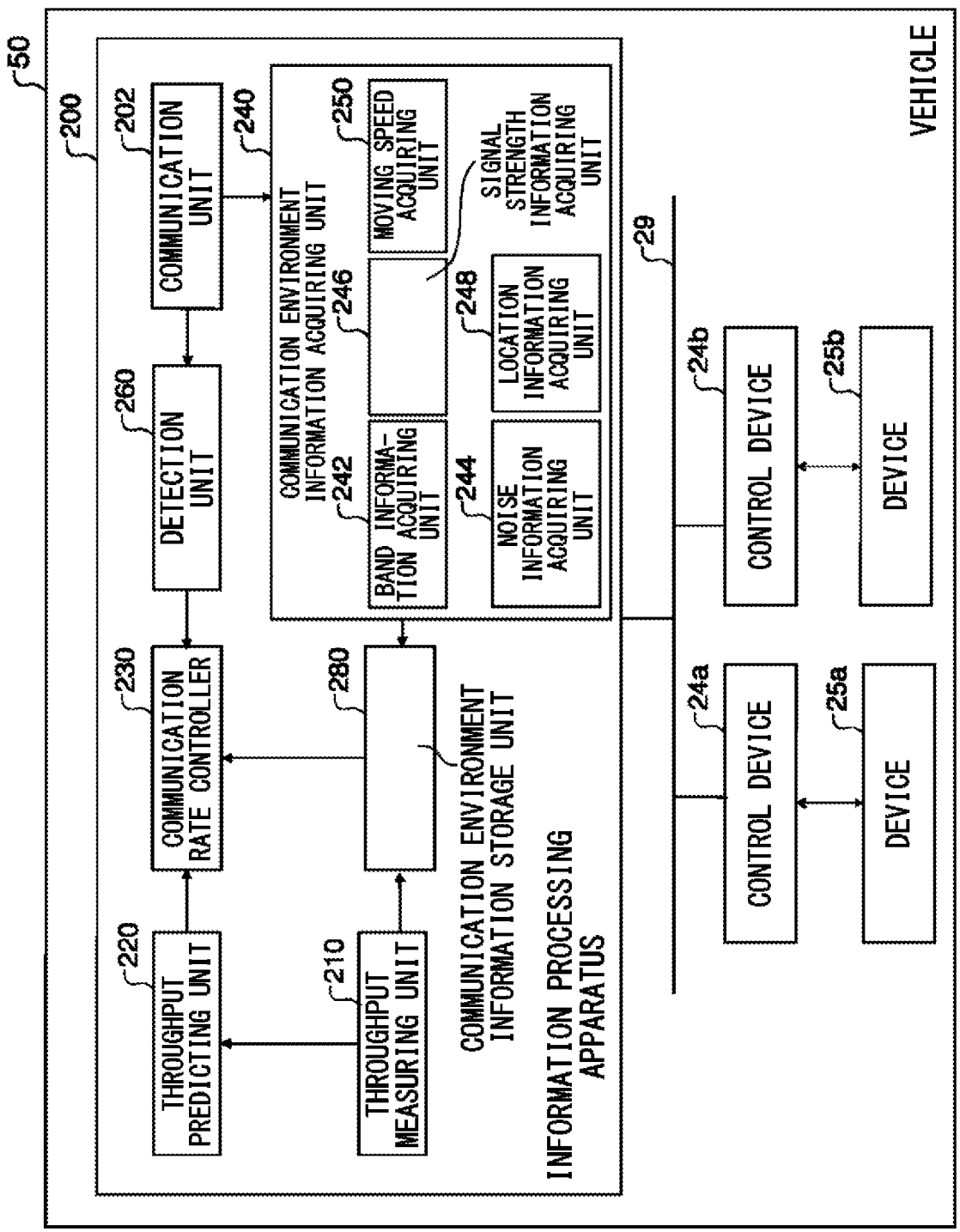
FIG. 2 schematically shows the functional configuration of the vehicle 50.

FIG. 2 schematically shows the functional configuration of the vehicle 50. The vehicle 50 comprises the information processing apparatus 200, a control device 24a, a control device 24b, a device 25a, a device 25b, and an in-vehicle network 29. The information processing apparatus 200 comprises a communication unit 202, a throughput measuring unit 210, a throughput predicting unit 220, a communication rate controller 230, a detection unit 260, a communication environment information acquiring unit 240, and a communication environment information storage unit 280. The communication environment information acquiring unit 240 includes a band information acquiring unit 242, a signal strength information acquiring unit 246, a location information acquiring unit 248, a noise information acquiring unit 244, and a moving speed acquiring unit 250. Note that, FIG. 2 shows functional blocks related to the present embodiment. The vehicle 50 and the information processing apparatus 200 may comprise other functional blocks than the functional blocks shown in FIG. 2.

The information processing apparatus 200, the control device 24a, and the control device 24b are connected through the in-vehicle network 29. The in-vehicle network 29 may include an Ethernetwork. The in-vehicle network 29 may include a CAN (Controller Area Network).

The information processing apparatus 200 may be formed by one ECU (electronic control unit) or one TCU (telematics control unit). The information processing apparatus 200 may be formed by a plurality of ECUs. The information processing apparatus 200 may be formed by one or more ECUs and one or more TCUs. The communication environment information storage unit 280 may be formed by non-volatile storage media. The control device 24a and the control device 24b control the device 25a and the device 25b, respectively. Each of the control device 24a and the control device 24b may be an ECU. The device 25a and the device 25b include a driveline device such as an engine, and an information communication device, for example. Note that, the control device 24a and the control device 24b may collectively be referred to as a "control device 24". The device 25a and the device 25b may collectively be referred to as a "device 25".

The communication unit 202 communicates with the external device 30 through the wireless communication system 92. The throughput measuring unit 210 measures a communication throughput for communicating with the external device 30. The throughput measuring unit 210 may measure a communication throughput in the uploading direction from the communication unit 202 to the external device 30. The throughput measuring unit 210 may measure a communication throughput in the downloading direction from the external device 30 to the communication unit 202. The throughput predicting unit 220 predicts a future communication throughput based on the communication throughput measured by the throughput measuring unit 210.

The throughput predicting unit 220 identifies a prediction model of time-series data by using a time-series data for a communication throughput, for example. The prediction model to be identified may be any model as long as the future time-series data can be predicted from the past time-series data by means of the model. Examples of the identified prediction model may include a time-series model, such as an AR model (Auto-Regressive Model), and a stochastic differential equation model, such as Vasicek model. By way of one example, with the Vasicek model, a model parameter of a general solution for a stochastic differential equation of the Vasicek model may be identified by a method such as a maximum likelihood estimation by using the general solution for the stochastic differential equation of the Vasicek model and a time-series data. The throughput predicting unit 220 calculates the probability distribution of the time-series data for the future communication throughput by using the identified prediction model. The throughput predicting unit 220 may predict the future communication throughput on the basis of the probability distribution of the time-series data for the future communication throughput. Note that, the throughput predicting unit 220 may calculate the probability distribution of the time-series data for the future communication throughput by using methods described in the above-described patent document 1 and the above-described patent document 2. As described in the above-described patent document 1 and the above-described patent document 2, the prediction model of the time-series data may be identified based on a corrected time-series data, which is obtained by calculating a correction factor on the basis of a communication model, by which a transient characteristic after starting communication for a communication protocol of TCP communication or the like is modeled, and using this correction factor for correcting the time-series data for removing influence of the The communication rate controller 230 controls a communication rate for communicating with the external device 30 by using the future communication throughput predicted by the throughput predicting unit 220. For example, the communication rate controller 230 may control the communication rate for communicating with the external device 30 by instructing the control device 24 to decrease the communication rate of the control device 24 communicating with the external device 30. The communication rate controller 230 may decrease the communication rate in accordance with the service provided by the control device 24. For example, among the services provided by the control device 24, the communication rate of the service of the communication of content data may have a higher priority of being decreased than the communication rate of the service of data communication of vehicle control-system-related information The band information acquiring unit 242 acquires band information to be used for communicating with the external device 30 from the mobile communication network. The communication environment information storage unit 280 stores the communication throughput measured by the throughput measuring unit 210 and the band information acquired by the band information acquiring unit 242 at a time when the communication throughput is measured, by associating them with each other. The detection unit 260 detects at least one of a handover execution or a communication band switching. Note that, examples of the handover may include at least any of a handover between cells, a handover between frequencies, or a handover between RATs.

If the detection unit 260 has detected at least one of the handover execution and the communication band switching, the communication rate controller 230 switches from controlling the communication rate based on the future communication throughput predicted by the throughput predicting unit 220, to controlling the communication rate based on band information acquired by the communication environment information storage unit 280 and by the band information acquiring unit 242. For example, if the detection unit 260 has detected at least one of the handover execution and the communication band switching, the communication rate controller 230 switches from controlling the communication rate based on the future communication throughput predicted by the throughput predicting unit 220 to controlling the communication rate based on the communication throughput that is associated with the band information acquired by the band information acquiring unit 242 and stored in the communication environment information storage unit 280.

Thus, if the handover execution or the communication band switching has been detected, the communication rate controller 230 switches to controlling the communication rate based on the band information to be used for communicating after the handover and the information stored in the communication environment information storage unit 280. In this manner, if the handover execution or the communication band switching has been detected, controlling the communication rate is performed not based on the future communication throughput predicted from the past communication throughput but based on the information stored in the communication environment information storage unit 280. This can improve the communication responsiveness and media quality just after the handover execution or the communication band switching.

The detection unit 260 detects a switching between a high frequency band and a low frequency band. For example, the detection unit 260 detects at least one of the switching from the high frequency band to the low frequency band or the switching from the low frequency band to the high frequency band. If the detection unit 260 has detected the switching between the high frequency band and the low frequency band, the communication rate controller 230 may switch from controlling the communication rate based on the future communication throughput predicted by the throughput predicting unit 220 to controlling the communication rate based on band information acquired by the communication environment information storage unit 280 and the band information acquiring unit 242. In a case where the detection unit 260 has detected the handover between cells, and if the detection unit 260 has not detected the switching between the high frequency band and the low frequency band, the communication rate controller 230 may maintain controlling the communication rate based on the future communication throughput predicted by the throughput predicting unit 220 without switching to controlling the communication rate based on the band information acquired by the communication environment information storage unit 280 and the band information acquiring unit 242. For example, in a case where the detection unit 260 has detected the handover between cells, and if the band information to be used for communication before the handover between cells is the same as the band information used for communication after the handover between cells, the communication rate controller 230 may maintain controlling the communication rate based on the future communication throughput predicted by the throughput predicting unit 220 without switching to controlling the communication rate based on the band information acquired by the communication environment information storage unit 280 and the band information acquiring unit 242. If the band information to be used for communication before the handover is the same as the band information to be used for communication after the handover, the throughput predicting unit 220 is more likely to predict the future communication throughput relatively accurately. In the information processing apparatus 200, if the detection unit 260 has detected the switching between the high frequency band and the low frequency band, the communication rate controller 230 switches to controlling the communication rate based on the band information acquired by the communication environment information storage unit 280 and the band information acquiring unit 242. Therefore redundant switching of controlling the communication rate can be reduced.

The noise information acquiring unit 244 acquires noise information of a communication signal used for communicating with the external device 30. Examples of the noise information may include a signal-to-interference-plus-noise-ratio (SINR), a signal to noise ratio (SNR), or the like. Other than the SINR and the SNR as the noise information, any information which is indicative of any link quality is applicable. The communication environment information storage unit 280 stores the communication throughput measured by the throughput measuring unit 210; the band information acquired by the band information acquiring unit 242 at a time when the communication throughput is measured; and the noise information acquired by the noise information acquiring unit 244 at a time when the communication throughput is measured, by associating them with each other. If the detection unit 260 has detected at least one of the handover execution and the communication band switching, the communication rate controller 230 switches from controlling the communication rate based on the future communication throughput predicted by the throughput predicting unit 220 to controlling the communication rate based on the communication throughput stored in the communication environment information storage unit 280, which is associated with band information acquired by the band information acquiring unit 242 and noise information that matches the noise information acquired by noise information acquiring unit 244. Thus, the communication rate can be controlled on the basis of the appropriate communication throughput, which takes into consideration not only the band information but also the noise information.

The signal strength information acquiring unit 246 acquires signal strength information of the communication signal used for communicating with the external device 30. Examples of the signal strength information may include any indicator such as a reference signal received power (RSRP). The communication environment information storage unit 280 stores the communication throughput measured by the throughput measuring unit 210; the band information acquired by the band information acquiring unit 242 at a time when the communication throughput is measured; and the signal strength information acquired by the signal strength information acquiring unit 246 at a time when the communication throughput is measured, by associating them with each other. If the detection unit 260 has detected at least one of the handover execution and the communication band switching, the communication rate controller 230 switches from controlling the communication rate based on the future communication throughput predicted by the throughput predicting unit 220 to controlling the communication rate based on the communication throughput stored in the communication environment information storage unit 280, the communication throughput being associated with the band information acquired by the band information acquiring unit 242 and signal strength information that matches the signal strength information acquired by the signal strength information acquiring unit 246. Thus, the communication rate can be controlled on the basis of the appropriate communication throughput in further consideration of not only the band information but also the signal strength information of the communication signal.

The moving speed acquiring unit 250 acquires a moving speed of the vehicle 50. For example, the moving speed acquiring unit 250 acquires the speed of the vehicle 50 by using a vehicle speed sensor. The communication environment information storage unit 280 stores the communication throughput measured by the throughput measuring unit 210; the band information acquired by the band information acquiring unit 242 at a time when the communication throughput is measured; and the moving speed of the vehicle 50 acquired by the moving speed acquiring unit 250 at a time when the communication throughput is measured, by associating them with each other. If the detection unit 260 has detected at least one of the handover execution and the communication band switching, the communication rate controller 230 switches from controlling the communication rate based on the future communication throughput predicted by the throughput predicting unit 220 to controlling the communication rate based on the communication throughput stored in the communication environment information storage unit 280, the communication throughput being associated with the band information acquired by the band information acquiring unit 242 and a moving speed that matches the moving speed acquired by the moving speed acquiring unit 250. Thus, the communication rate can be controlled on the basis of the appropriate communication throughput in further consideration of the influence of the Doppler effect according to the moving speed of the vehicle 50.

The location information acquiring unit 248 acquires location information of the vehicle 50. For example, the location information acquiring unit 248 acquires latitude information and longitude information calculated by using GPS signals received from GPS satellites as the location information. The communication environment information storage unit 280 stores the communication throughput measured by the throughput measuring unit 210; the band information acquired by the band information acquiring unit 242 at a time when the communication throughput is measured; and the location information of the vehicle 50 acquired by the location information acquiring unit 248 at a time when the communication throughput is measured, by associating them with each other. If the detection unit 260 has detected at least one of the handover execution and the communication band switching, the communication rate controller 230 switches from controlling the communication rate based on the future communication throughput predicted by the throughput predicting unit 220 to controlling the communication rate based on the communication throughput stored in the communication environment information storage unit 280, the communication throughput being associated with the band information acquired by the band information acquiring unit 242 and location information that matches the location information acquired by the location information acquiring unit 248. For example, in a case where a handover is performed to a base station to which the communication unit 202 has connected in the past, even if the band information to be used for the communication after the handover is the same as the band information used in the past when connecting to the same base station, the communication throughput may be different from the communication throughput used in the past when connecting to the same base station. This is because the communication environment may be different depending on the location of the vehicle 50. For this, the communication rate controller 230 can control the communication rate on the basis of the appropriate communication throughput further in consideration of the location information of the vehicle 50.

After the communication rate controller 230 has switched to controlling the communication rate based on the band information acquired by the communication environment information storage unit 280 and the band information acquiring unit 242, the throughput predicting unit 220 predicts the future communication throughput on the basis of the communication throughput measured by the throughput measuring unit 210 after the handover execution or the communication band switching. When a predetermined time has passed since the handover execution or the communication band switching, the communication rate controller 230 switches from controlling the communication rate based on the band information acquired by the communication environment information storage unit 280 and the band information acquiring unit 242 to controlling the communication rate based on the future communication throughput predicted by the throughput predicting unit 220. Thus, for example, after the handover execution, when the throughput predicting unit 220 starts predicting the future communication throughput more accurately by using the communication throughput measured after the handover execution, the communication rate controller 230 can switch to controlling the communication rate based on the future communication throughput predicted by the throughput predicting unit 220. Thus, the information processing apparatus 200 can prevent a temporary decrease in communication quality in response to the switching of controlling way of the communication rate.

FIG. 3 shows the data structure of communication environment information stored in the communication environment information storage unit 280. As shown in FIG. 3, the communication environment information associates a communication throughput, a band, a SINR, the RSRP, a moving speed, a location and a clock time with each other. One piece of the communication environment information data is configured of a combination of a communication throughput, a band, a SINR, the RSRP, a moving speed, a location and a clock time.

In the "communication throughput," a communication throughput measured by the throughput measuring unit 210 is stored. For example, a numeric value indicative of a data transfer rate (bit rate) is stored in the "communication throughput." In the "band," band information acquired by the band information acquiring unit 242 is stored. Examples of the band information may include a band 1 (B1), band 3 (B3), and band 8 (B8) identifying a LTE radio frequency band, and the n41 and n42 identifying a 5G radio frequency band.

In the "SINR," the value of a SINR is stored. The SINR may be a receiving SINR. The value of a SINR is calculated by the communication unit 202. In the "RSRP," the value of a RSRP is stored. The value of a RSRP is calculated by the communication unit 202.

In the "moving speed," a moving speed of the vehicle 50 acquired by the moving speed acquiring unit 250 is stored. The moving speed of the vehicle 50 may be the vehicle speed of the vehicle 50 detected by the vehicle speed sensor. In the "location," location information acquired by the location information acquiring unit 248 is stored. The location information may be latitude information and longitude information calculated by using GPS signals received from GPS satellites.

In the "clock time," a clock time when the communication throughput, the band, the SINR, the RSRP, the location, and the moving speed are acquired is stored. One piece of the communication environment information includes the communication throughput, band, SINR, RSRP, location, and moving speed acquired at the same clock time or the substantially same clock time. In the "clock time," one representative clock time at the point in time when one piece of the communication environment information is acquired is stored. For example, the clock time when the communication throughput is measured may be stored in the "clock time."

The clock time when the communication environment information storage unit 280 stores one piece of data for the communication environment information may be stored in the "clock time."

Note that, the communication environment information storage unit 280 may delete a piece of communication environment information having been stored for more than a predetermined period since a clock time included in the communication environment information, among pieces of the stored communication environment information. The communication environment information storage unit 280 may store the communication environment information up to a predetermined number per the band information. In a situation where new communication environment information is to be stored, if the number of communication environment information including band information identical with band information included in the new communication environment information has reached a predetermined number, the communication environment information storage unit 280 may delete the communication environment information including the oldest clock time among pieces of the communication environment information including identical band information and stores the new communication environment information.

If the detection unit 260 has detected a handover, the detection unit 260 outputs a handover notification to the communication rate controller 230, the handover notification including band information acquired by the band information acquiring unit 242, a SINR acquired by the noise information acquiring unit 244, a RSRP acquired by the signal strength information acquiring unit 246, a moving speed acquired by the moving speed acquiring unit 250, and location information acquired by the location information acquiring unit 248.

Note that, the band information included in the handover notification is band information to be used for the communication after the handover. For example, in a case where a handover between cells or a handover between RATs has occurred, the band information included in the handover notification is the band information to be used for communicating with the base station to which handover is performed. In a case where a handover between frequencies has occurred, the band information included in the handover notification is the band information of the destination to which handover is performed. The SINR included in the handover notification is the SINR of the communication signal after the handover. The RSRP included in the handover notification is the RSRP of the communication signal after the handover. The moving speed included in the handover notification is the moving speed of the vehicle 50 measured after the handover. The location included in the handover notification is the location of the vehicle 50 measured after the handover.

In response to receiving the handover notification, the communication rate controller 230 selects a communication throughput associated with information that matches a combination of the band information, the SINR, the RSRP, the moving speed, the location information included in the received handover notification from communication throughputs stored in the communication environment information storage unit 280 to use the selected communication throughput for controlling the communication rate of the control device 24.

By way of one example, the communication rate controller 230 sets a priority level in the order of the band information, the SINR, the RSRP, the moving speed and the location to select the matching communication throughput in accordance with the priority level. For example, the communication rate controller 230 selects a communication throughput associated with band information being consistent with the band information included in the handover notification from communication throughputs stored in the communication environment information storage unit 280. In a case where only one communication throughput associated with the band information being consistent with the band information included in the handover notification exists in the communication throughputs stored in the communication environment information storage unit 280, the communication rate controller 230 controls the communication rate of the control device 24 on the basis of the one communication throughput selected. Note that in a case where no communication throughput associated with the band information being consistent with the band information included in the handover notification exists in the communication throughputs stored in the communication environment information storage unit 280, the communication rate controller 230 may control the communication rate of the control device 24 on the basis of the lowest communication throughput predetermined for the band information.

Meanwhile, in a case where a plurality of communication throughputs associated with the band information being consistent the band information included in the handover notification exists in the communication throughputs stored in the communication environment information storage unit 280, the communication rate controller 230 selects, from the selected communication throughputs, the communication throughput associated with a SINR different from the SINR included in the handover notification by a predetermined value or less. In a case where only one communication throughput associated with the SINR different from the SINR included in the handover notification by a predetermined value or less exists in the communication throughputs stored in the communication environment information storage unit 280, the communication rate controller 230 controls the communication rate of the control device 24 on the basis of the one communication throughput selected. Note that, in a case where no communication throughput associated with the SINR different from the SINR included in the handover notification by a predetermined value or less exists in the communication throughputs stored in the communication environment information storage unit 280, the communication rate controller 230 may control the communication rate of the control device 24 on the basis of the lowest communication throughput among communication throughputs associated with the band information being consistent with the band information included in the handover notification.

Meanwhile, in a case where a plurality of communication throughputs associated with the SINR different from the SINR included in the handover notification by a predetermined value or less exists in the communication throughputs stored in the communication environment information storage unit 280, the communication rate controller 230 selects, from the selected communication throughputs, the communication throughput associated with a RSRP different from the RSRP included in the handover notification by a predetermined value or less. In a case where only one communication throughput associated with the RSRP different from the RSRP included in the handover notification by a predetermined value or less exists in the communication throughputs stored in the communication environment information storage unit 280, the communication rate controller 230 controls the communication rate of the control device 24 on the basis of the one communication throughput selected. Note that in a case where no communication throughput associated with the RSRP different from the RSRP included in the handover notification by a predetermined value or less exists in the communication throughputs stored in the communication environment information storage unit 280, the communication rate controller 230 may control the communication rate of the control device 24 on the basis of the lowest communication throughput among the plurality of communication throughputs associated with the SINR different from the SINR included in the handover notification by a predetermined value or less.

Meanwhile, in a case where a plurality of communication throughputs associated with the RSRP different from the RSRP included in the handover notification by a predetermined value or less exists in the communication throughputs stored in the communication environment information storage unit 280, the communication rate controller 230 selects, from the selected communication throughputs, the communication throughput associated with a moving speed different from the moving speed included in the handover notification by a predetermined value or less. In a case where only one communication throughput associated with the moving speed different from the moving speed included in the handover notification by a predetermined value or less exists in the communication throughputs stored in the communication environment information storage unit 280, the communication rate controller 230 controls the communication rate of the control device 24 on the basis of the one communication throughput selected. Note that, in a case where no communication throughput associated with the moving speed different from the moving speed included in the handover notification by a predetermined value or less exists in the communication throughputs stored in the communication environment information storage unit 280, the communication rate controller 230 may control the communication rate of the control device 24 on the basis of the lowest communication throughput among the plurality of communication throughputs associated with the RSRP different from the RSRP included in the handover notification by a predetermined value or less.

Meanwhile, in a case where a plurality of communication throughputs associated with the moving speed different from the moving speed included in the handover notification by a predetermined value or less exists in the communication throughputs stored in the communication environment information storage unit 280, the communication rate controller 230 selects, from the selected communication throughputs, the communication throughput associated with a location having a distance from the location included in the handover notification being within a predetermined value. In a case where only one communication throughput associated with the location having a distance from the location included in the handover notification being within a predetermined value exists in the communication throughputs stored in the communication environment information storage unit 280, the communication rate controller 230 controls the communication rate of the control device 24 on the basis of the one communication throughput selected.

In a case where a plurality of communication throughputs associated with the location having a distance from the location included in the handover notification being within a predetermined value exists, the communication rate controller 230 may control the communication rate of the control device 24 based on the lowest communication throughput among the selected communication throughputs. The communication rate controller 230 may also control the communication rate of the control device 24 on the basis of the average value of the plurality of selected communication throughputs.

In a case where no communication throughput associated with the location having a distance from the location included in the handover notification being within a predetermined value exists, the communication rate controller 230 may control the communication rate of the control device 24 on the basis of the lowest communication throughput among the plurality of communication throughputs associated with the moving speed different from the moving speed included in the above-mentioned handover notification by a predetermined value or less. The communication rate controller 230 may also control the communication rate of the control device 24 on the basis of the average value of the plurality of the communication throughputs associated with the moving speed different from the moving speed included in the above-mentioned handover notification by a predetermined value or less.

Note that, the priority level of the SINR, the RSRP, the moving speed and the location is not limited to the above-mentioned priority level. As the priority level of the SINR, the RSRP, the moving speed and the location, any priority level may be adopted.

Figure 4:
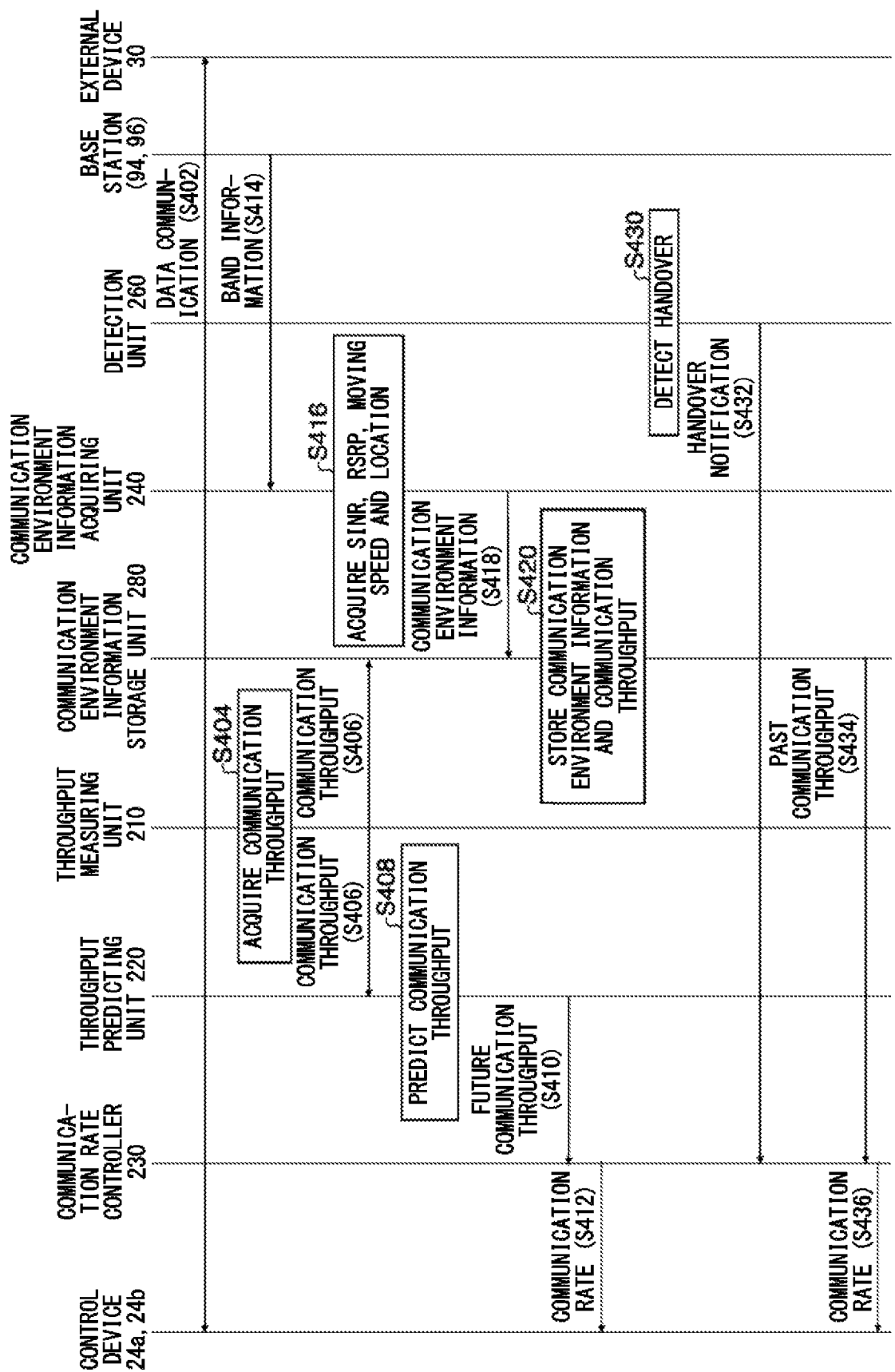
FIG. 4 shows the time sequence of the data flow between a control device 24, a functional block of an information processing apparatus 200, base stations 94, 96, and an external device 30.

FIG. 4 shows the time sequence of the data flow between the control device 24, the functional blocks of the information processing apparatus 200, base stations 94, 96, and the external device 30. Through the communication unit 202 and the base station (94, 96), the control device 24 starts data communication with the external device 30 (S402).

During the communication with the external device 30, the throughput measuring unit 210 acquires a communication throughput (S404). For example, the throughput measuring unit 210 may acquire information indicative of the communication throughput from each of the control devices 24. The throughput measuring unit 210 may acquire information indicative of the communication throughput from the communication unit 202. The throughput measuring unit 210 outputs the acquired communication throughput to the throughput predicting unit 220 and the communication environment information storage unit 280 (S406).

The throughput predicting unit 220 predicts a future communication throughput on the basis of the communication throughput measured by the throughput measuring unit 210 (S408), and outputs the predicted future communication throughput to the communication rate controller 230 (S410). The communication rate controller 230 controls the communication rate of the control device 24 on the basis of the communication throughput predicted by the throughput predicting unit 220 (S412).

In the communication environment information acquiring unit 240, the band information acquiring unit 242 acquires, through the communication unit 202, the band information which the communication unit 202 received from the base stations (94, 96) (S414). In the communication environment information acquiring unit 240, the noise information acquiring unit 244, the signal strength information acquiring unit 246, the moving speed acquiring unit 250, and the location information acquiring unit 248 acquire the SINR, the RSRP, the moving speed, and the location information as communication environment information, respectively (S416).

The communication environment information acquiring unit 240 outputs information including the SINR, the RSRP, the moving speed, and the location information as well as the acquired band information to the communication environment information storage unit 280 (S418). Subsequently, the communication environment information storage unit 280 associates the communication throughput acquired in S406 with the communication environment information including the SINR, the RSRP, the moving speed, and the location information that are acquired in the communication environment information acquiring unit 240 and stores them (S420).

In response to the detection unit 260 detecting a handover (S430), the detection unit 260 outputs a handover notification to the communication rate controller 230 (S432). The detection unit 260 outputs the handover notification including the band information acquired by the band information acquiring unit 242, the SINR acquired by the noise information acquiring unit 244, the RSRP acquired by the signal strength information acquiring unit 246, the location information acquired by the location information acquiring unit 248, and the moving speed acquired the moving speed acquiring unit 250, to the communication rate controller 230.

The communication rate controller 230 selects a past communication throughput associated with the information that matches the information included in the handover notification among pieces of the communication environment information stored in the communication environment information storage unit 280 (S434). The communication rate controller 230 indicates the communication rate based on the selected communication throughput to the control device 24 (S436). For example, the communication rate controller 230 restricts the communication rate of content data, rather than the communication rate of vehicle control-system-related information among data communication between the control device 24 and the external device 30. For example, the communication rate controller 230 instructs the control device 24 to decrease the communication rate of content data to maintain the communication rate of vehicle control-system-related information.

Figure 5:
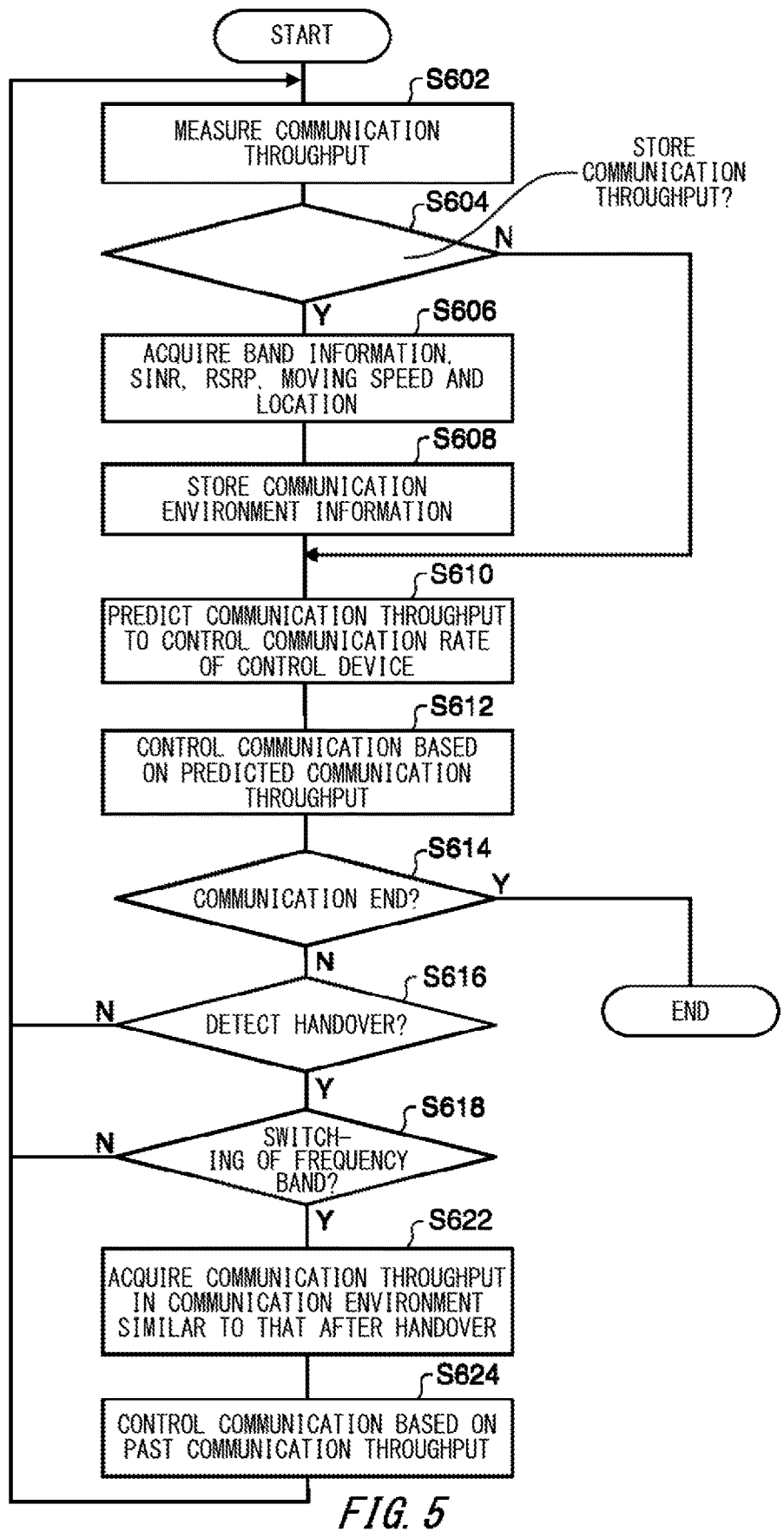
FIG. 5 shows the flowchart related to an information processing method performed by an information processing apparatus 200.

FIG. 5 shows a flowchart related to the information processing method performed by the information processing apparatus 200. The processing of this flowchart starts in response to the communication unit 202 starting communication with the external device 30. In S602, the throughput measuring unit 210 measures a communication throughput.

In S604, the information processing apparatus 200 determines whether to cause the communication environment information storage unit 280 to store the measured communication throughput. For example, in a case where there is no communication throughput being different from the communication throughput measured in S602 by a predetermined value or less, among the communication throughputs associated with band information that is currently used for communication and stored in the communication environment information storage unit 280, the information processing apparatus 200 may determine to cause the communication environment information storage unit 280 to store the measured communication throughput. If the communication environment information storage unit 280 is caused to store the measured communication throughput, the band information acquiring unit 242, the noise information acquiring unit 244, the signal strength information acquiring unit 246, the moving speed acquiring unit 250, and the location information acquiring unit 248 acquire the band information, the SINR the RSRP, the moving speed, and the location, respectively in S606. In S608, the communication environment information storage unit 280 stores the communication throughput acquired in S606, the information acquired in S606, and the current clock time, by associating them with each other, and the processing advances to S610. If the measured communication throughput is determined not to be stored in the communication environment information storage unit 280 in S604, the processing advances to S610, by skipping S606 and S608.

In S610, the throughput predicting unit 220 predicts a future communication throughput on the basis of the communication throughput measured in S602. In 612, the communication unit 202 controls data communication on the basis of the communication throughput predicted by the throughput predicting unit 220. For example, the communication rate controller 230 decides the communication rate of data communication of content data and the communication rate of data communication of the vehicle control-system-related information on the basis of the communication throughput predicted by the throughput predicting unit 220 to instruct the control device 24 to communicate at the decided communication rate or less.

In S614, it is determined whether data communication with the external device 30 has ended. If the data communication has ended, the processing of this flowchart ends. If the data communication has not ended, it is determined whether the detection unit 260 has detected a handover in S616. If the detection unit 260 has detected no handover, the processing advances to S602. If the detection unit 260 has detected a handover, the communication rate controller 230 determines whether the switching of frequency band used for communication has occurred in S618.

For example, the communication rate controller 230 determines whether the switching of frequency band used for communication has occurred by using band information included in the handover notification acquired from the detection unit 260. The communication rate controller 230 determines whether the switching of frequency band used for communication in a case where the band information is switched before and after the handover, for example. Note that in a case where a handover between cells has occurred, the communication rate controller 230 may determine that no switching of frequency band has occurred if the band information to be used for communication is the same before and after the handover between cells. For example, in a case where a handover from the base station 94 to the base station 96 has occurred, if the band information used before the handover is 5G n41, and the band information to be used after the handover is also 5G n41, the communication rate controller 230 determines that no switching of frequency band has occurred. If it is determined that the switching of frequency band has not occurred in S618, the processing advances to S602.

If it is determined that the switching of the frequency band has occurred in S618, the communication rate controller 230 acquires the communication throughput in a communication environment similar to the communication environment after the handover in S622. For example, as described in relation to FIG. 3, for example, in S622, the communication rate controller 230 selects a communication throughput associated with information that matches a combination of the band information, the SINR, the RSRP, the moving speed, the location information included in the handover notification from communication throughputs stored in the communication environment information storage unit 280.

Subsequently, in S624, the communication rate controller 230 uses the communication throughput acquired in S622 for controlling data communication for a predetermined period of time. For example, the communication rate controller 230 decides the communication rate of data communication of content data and the communication rate of data communication of the vehicle control-system-related information on the basis of the communication throughput acquired in S622 to instruct the control device 24 to communicate at the decided communication rate or less. When the predetermined period of time has passed since starting the control of S624, the processing advances to S602.

In the above-described embodiment, the communication environment information stored in the communication environment information storage unit 280 is the communication environment information acquired by the information processing apparatus 200 in vehicle 50 itself. As a variant example of the present embodiment, the communication environment information storage unit 280 may store the communication environment information acquired by another vehicle. This can increase the possibility that, in a situation, for example, where the vehicle 50 uses band information which has not been used for communication in the past after a handover, the communication rate controller 230 can acquire an appropriate communication throughput associated with band information to be used after the handover among pieces of the communication environment information stored in the communication environment information storage unit 280.

In sum, in a situation of having different communication environment due to the occurrence of a handover, the information processing apparatus 200 can control the communication rate on the basis of the communication throughput in a communication environment similar to the communication environment after the handover among the past communication throughputs stored in the communication environment information storage unit 280. Thus, the communication rate can be controlled more appropriately than a case where the communication rate is controlled by predicting a future communication throughput on the basis of the communication throughput before the communication environment changes due to the occurrence of a handover. For example, in a case where the frequency band for communication switches from 5G band to a particular slow 4G band, the communication rate of content data can be decreased in consideration of the record value of the communication throughput used when communicating in the particular 4G band in the past. Thus, the information processing apparatus 200 may be able to prevent a communication shutdown or a remarkable reduction of media quality in response to a handover. In a case where the frequency band for communication switches from slow 4G band to a particular fast 5G band, the communication rate of content data can be increased in consideration of the record value of the communication throughput used when communicating in the particular 5G band in the past. Thus, the communication responsiveness and the media quality may be promptly increased after a handover. Meanwhile, as described in the above-described patent document 3, adopting technology which requests test data in response to the occurrence of a handover to acquire a throughput information based on a receiving rate of the test data requires a certain time to calculate a throughput. There is an issue of decreasing a communication responsiveness and media quality just after the handover event. As mentioned above, the information processing apparatus 200 can mitigate such an issue.

Note that, the vehicle 50 is one example of a mobile object. The mobile object includes transport equipment such as a motor vehicle (for example, a passenger vehicle and a bus), a saddle riding type vehicle, an aerial vehicle, and a ship. The mobile object is not limited to transport equipment but may be any mobile equipment.

Figure 6:
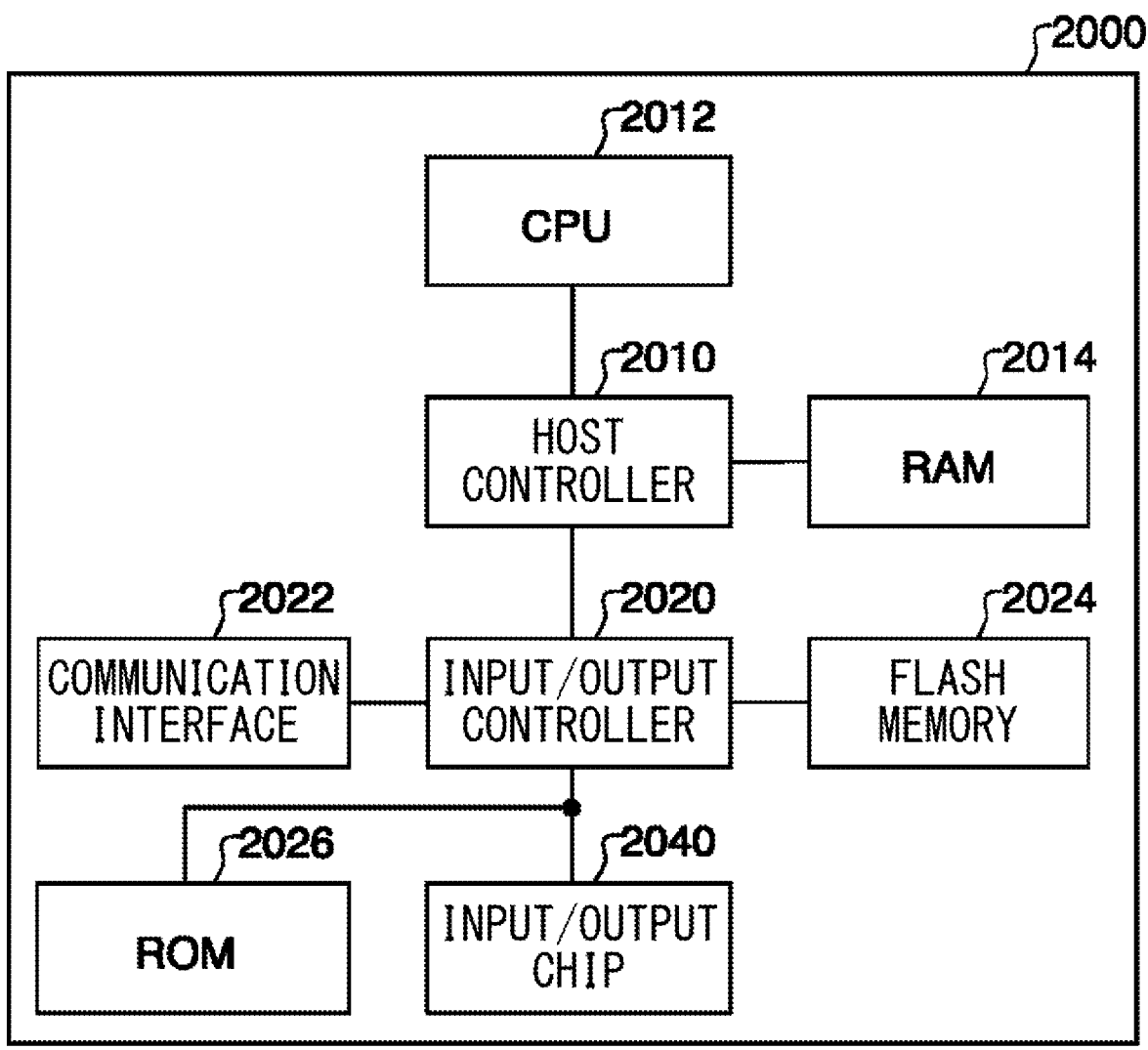
FIG. 6 shows an example of a computer 2000.

FIG. 6 shows an example of a computer 2000 in which a plurality of embodiments of the present invention may be entirely or partially embodied. A program installed in the computer 2000 can cause the computer 2000 to serve as an information processing apparatus according to the embodiments or each unit of the information processing apparatus, to execute operation associated with the information processing apparatus or each unit of the information processing apparatus, and/or to execute a process according to the embodiments or a step of the process. Such a program may be executed by a CPU 2012 in order to cause the computer 2000 to execute a specific operation associated with some or all of the processing procedures and the blocks in the block diagram described herein.

The computer 2000 according to this embodiment includes the CPU 2012 and RAM 2014, which are mutually connected by a host controller 2010. The computer 2000 also includes ROM 2026, a flash memory 2024, a communication interface 2022, and an input/output chip 2040. The ROM 2026, the flash memory 2024, the communication interface 2022 and the input/output chip 2040 are connected to the host controller 2010 through an input/output controller 2020.

The CPU 2012 operates according to the programs stored in the ROM 2026 and the RAM 2014, thereby controlling each unit.

The communication interface 2022 communicates with other electronic devices through a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 through an input/output port such as a serial port, a parallel port, a keyboard port, a mouse port, a monitor port, a USB port, or an HDMI (registered trademark) port.

The programs are provided through a computer-readable storage medium, such as a CD-ROM, a DVD-ROM, or a memory card, or through a network. The RAM 2014, the ROM 2026, or the flash memory 2024 is an example of the computer-readable storage medium. The programs are installed in the flash memory 2024, the RAM 2014 or the ROM 2026, and are executed by the CPU 2012. Information processing described in those programs is read by the computer 2000, and provides cooperation between the programs and the various types of hardware resources described above. The information processing apparatus or the information processing method may be configured by achieving operation or processing of information according to a use of the computer 2000.

For example, in a case where communication is performed between the computer 2000 and an external device, the CPU 2012 may execute a communication program loaded in the RAM 2014, and instruct the communication interface 2022 to execute communication processing, based on processing described in the communication program. The communication interface 2022, under control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or a necessary portion of a file or a database stored in the recording medium such as the flash memory 2024 or the like, to be read by the RAM 2014, and may execute various types of processing on the data on the RAM 2014. Then, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described herein and specified by instruction sequences of the programs, and writes back the results into the RAM 2014. Moreover, the CPU 2012 may retrieve information in a file, a database, or the like in the recording medium. For example, in a case where a plurality of entries, each having an attribute value of a first attribute associated with an attribute value of a second attribute, are stored in the recording medium, the CPU 2012 may retrieve, out of the plurality of entries, an entry with the attribute value of the first attribute specified that meets a condition, read the attribute value of the second attribute stored in said entry, and thereby obtain the attribute value of the second attribute associated with the first attribute meeting a predetermined condition.

The above-described programs or software module may be stored on the computer 2000 or in the computer-readable storage medium in the vicinity of the computer 2000. A recording medium such as a hard disk or RAM provided in a server system connected to a dedicated communication network or the Internet can be used as the computer-readable storage medium. The programs stored in the computer-readable storage medium may be provided to the computer 2000 through the network.

The program that is installed in the computer 2000 and that causes the computer 2000 to serve as the information processing apparatus 200 may instruct the CPU 2012 or the like to cause the computer 2000 to serve as each unit of the information processing apparatus 200. The information processing described in those programs are read by the computer 2000, thereby serving as each unit of the information processing apparatus 200, which is specific means realized by the cooperation of software and the various types of hardware resources mentioned above. Then, those specific means achieves operations or processing of information corresponding to the intended use of the computer 2000 according to this embodiment, so that the information processing apparatus 200 is constructed as a specific one corresponding to the intended use.

Various embodiments have been described with reference to the block diagram or the like. In the block diagram, each block may represent (1) a step of a process in which an operation is executed, or (2) each unit of the apparatus responsible for executing the operation. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or through a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

24: control device
25: device
29: in-vehicle network
30: external device
50: vehicle
90: communication network
92: wireless communication system
94, 96: base station
200: information processing apparatus
202: communication unit
210: throughput measuring unit
220: throughput predicting unit
230: communication rate controller
240: communication environment information acquiring unit
242: band information acquiring unit
244: noise information acquiring unit
246: signal strength information acquiring unit
248: location information acquiring unit
250: moving speed acquiring unit
260: detection unit
280: communication environment information storage unit
2000: computer
2010: host controller
2012: CPU
2014: RAM
2020: input/output controller
2022: communication interface
2024: flash memory
2026: ROM
2040: input/output chip

What is claimed is:

1. An information processing apparatus comprising a processor and computer readable instructions which when executed by the processor perform a method using a communication interface configured to communicate with an external device through a mobile communication network, the information processing apparatus being configured and adapted to: measure a communication throughput for communicating with the external device;
predict a future communication throughput based on the measured communication throughput;
control a communication rate for communicating with the external device based on the predicted future communication throughput;
acquire band information to be used for communicating with the external device from the mobile communication network;
store the measured communication throughput and the band information acquired at a time when the communication throughput is measured, by association with each other; and
detect at least one of a handover execution and a communication band switching,
wherein if at least one of a handover execution and a communication band switching is detected, the information processing apparatus is further configured and adapted to switch from controlling the communication rate based on the predicted future communication throughput to controlling the communication rate based on the acquired band information.

2. The information processing apparatus according to claim 1,
wherein the information processing apparatus is further configured and adapted to detect a switching between a high frequency band and a low frequency band, and
if a switching between a high frequency band and a low frequency band has been detected, the information processing apparatus communication rate controller is further configured and adapted to switch from controlling the communication rate based on the predicted future communication throughput to controlling the communication rate based on the acquired band information.

3. The information processing apparatus according to claim 1,
wherein if at least one of a handover execution and a communication band switching has been detected, the information processing apparatus is further configured and adapted to switch from controlling the communication rate based on the predicted future communication throughput to controlling the communication rate based on the stored communication throughput in association with the acquired band information.

4. The information processing apparatus according to claim 1, wherein the information processing apparatus is further configured and adapted to acquire noise information of a communication signal used for communicating with the external device,
- wherein the information processing apparatus is configured and adapted to store: the measured communication throughput; the band information acquired at a time when the communication throughput is measured; and the noise information acquired at a time when the communication throughput is measured, by association with each other,
- wherein if at least one of a handover execution and a communication band switching has been detected, the information processing apparatus is further configured and adapted to switch from controlling the communication rate based on the predicted future communication throughput to controlling the communication rate based on the stored communication throughput in association with the acquired band information and noise information that matches the acquired noise information.

5. The information processing apparatus according to claim 1, wherein the information processing apparatus is further configured and adapted to acquire signal strength information of a communication signal used for communicating with the external device,
- wherein the information processing apparatus is further configured and adapted to store: the measured communication throughput; the band information acquired at a time when the communication throughput is measured; and the signal strength information acquired at a time when the communication throughput is measured, by association with each other,
- wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and signal strength information that matches the acquired signal strength information.

6. The information processing apparatus according to claim 1, the information processing apparatus being equipped with a mobile object, the information processing apparatus further comprising a speed sensor configured to acquire a moving speed of the mobile object,
- wherein the information processing apparatus is further configured and adapted to store: the measured communication throughput; the band information acquired at a time when the communication throughput is measured; and the moving speed of the mobile object acquired by the speed sensor at a time when the communication throughput is measured, by association with each other,
- wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and a moving speed that matches the moving speed acquired by the speed sensor.

7. The information processing apparatus according to claim 1,
- wherein after the switching from controlling the communication rate based on the predicted future communication throughput to controlling the communication rate based on the acquired band information has been performed, the information processing apparatus is further configured and adapted to predict a future communication throughput based on the communication throughput measured after the handover execution or the communication band switching,
- wherein when a predetermined time has passed since the handover execution or the communication band switching, the information processing apparatus is further configured to switch from controlling the communication rate based on the acquired band information to controlling the communication rate based on the predicted future communication throughput.

8. The information processing apparatus according to claim 2,
- wherein at least one of a handover execution and a communication band switching has been detected, the information processing apparatus is further configured and adapted to switch from controlling the communication rate based on the predicted future communication throughput to controlling the communication rate based on the communication throughput stored in association with the acquired band information.

9. The information processing apparatus according to claim 2, wherein the information processing apparatus is further configured and adapted to acquire noise information of a communication signal used for communicating with the external device,
- wherein the information processing apparatus is configured and adapted to store: the measured communication throughput; the band information acquired at a time when the communication throughput is measured; and the noise information acquired at a time when the communication throughput is measured, by association with each other,
- wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and noise information that matches the acquired noise information.

10. The information processing apparatus according to claim 3, wherein the information processing apparatus is further configured and adapted to acquire noise information of a communication signal used for communicating with the external device,
- wherein the information processing apparatus is configured and adapted to store: the measured communication throughput; the band information acquired at a time when the communication throughput is measured; and the noise information acquired at a time when the communication throughput is measured, by association with each other, wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and noise information that matches the acquired noise information.

11. The information processing apparatus according to claim 8, wherein the information processing apparatus is further configured and adapted to acquire noise information of a communication signal used for communicating with the external device,
   wherein the information processing apparatus is configured and adapted to store: the measured communication throughput; the band information acquired at a time when the communication throughput is measured; and the noise information acquired at a time when the communication throughput is measured, by association with each other,
   wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and noise information that matches the acquired noise information.

12. The information processing apparatus according to claim 2, wherein the information processing apparatus is further configured and adapted to acquire signal strength information of a communication signal used for communicating with the external device,
   wherein the information processing apparatus is configured and adapted to store: the measured communication throughput; the band information acquired at a time when the communication throughput is measured; and the signal strength information acquired at a time when the communication throughput is measured, by association with each other,
   wherein if at least one of a handover execution and a communication band switching has been detected, the information processing apparatus is further configured and adapted to switch from controlling the communication rate based on the predicted future communication throughput to controlling the communication rate based on a communication throughput stored in association with the acquired band information and signal strength information that matches the acquired signal strength information.

13. The information processing apparatus according to claim 3, wherein the information processing apparatus is further configured and adapted to acquire signal strength information of a communication signal used for communicating with the external device,
   wherein the information processing apparatus is further configured and adapted to store: the measured communication throughput; the band information acquired at a time when the communication throughput is measured; and the signal strength information acquired at a time when the communication throughput is measured, by association with each other,
   wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and signal strength information that matches the acquired signal strength information.

14. The information processing apparatus according to claim 8, wherein the information processing apparatus is further configured and adapted to acquire signal strength information of a communication signal used for communicating with the external device,
   wherein the information processing apparatus is further configured and adapted to store: the measured communication throughput; the band information acquired at a time when the communication throughput is measured; and the signal strength information acquired at a time when the communication throughput is measured, by association with each other,
   wherein if at least one of a handover execution and a communication band switching has been detected, the information processing apparatus is further configured and adapted to switch from controlling the communication rate based on the predicted future communication throughput to controlling the communication rate based on the communication throughput stored in association with the acquired band information and signal strength information that matches the acquired signal strength information.

15. The information processing apparatus according to claim 2, the information processing apparatus being equipped with a mobile object, the information processing apparatus further comprising a speed sensor configured to acquire a moving speed of the mobile object,
   wherein the information processing apparatus is further configured and adapted to store: the measured communication throughput; the band information acquired at a time when the communication throughput is measured; and the moving speed of the mobile object acquired by speed sensor at a time when the communication throughput is measured, by association with each other,
   wherein if at least one of a handover execution and a communication band switching has been detected, the information processing apparatus is further configured and adapted to switch from controlling the communication rate based on the predicted future communication throughput to controlling the communication rate based on a communication throughput stored in association with the acquired band information and a moving speed that matches the moving speed acquired by the speed sensor.

16. The information processing apparatus according to claim 3, the information processing apparatus being equipped with a mobile object, the information processing apparatus further comprising a speed sensor configured to acquire a moving speed of the mobile object,
   wherein the information processing apparatus is further configured and adapted to store: the measured communication throughput; the band information acquired at a time when the communication throughput is measured; and the moving speed of the mobile object acquired by the peed sensor at a time when the communication throughput is measured, by association with each other, wherein if at least one of a handover execution and a communication band switching has been detected, the information processing apparatus is further configured and adapted to switch from controlling the communication rate based on the predicted future communication throughput to controlling the communication rate based on a communication throughput stored in association with the acquired band information and a moving speed that matches the moving speed acquired by the speed sensor.

17. The information processing apparatus according to claim 2,
wherein after the switching from controlling the communication rate based on the predicted future communication throughput to controlling the communication rate based on the acquired band information has been performed, the information processing apparatus is further configured and adapted to predict a future communication throughput based on the communication throughput measured after the handover execution or the communication band switching,
wherein when a predetermined time has passed since the handover execution or the communication band switching, the information processing apparatus is further configured to switch from controlling the communication rate based on the acquired band information to controlling the communication rate based on the predicted future communication throughput.

18. A mobile object comprising the information processing apparatus according to claim 1.

19. A non-transitory computer-readable storage medium storing a program, the program causing a computer comprising a communication interface configured to communicate with an external device through a mobile communication network to carry out:
measuring a communication throughput for communicating with the external device;
predicting a future communication throughput based on a communication throughput measured in the measuring;
controlling a communication rate for communicating with the external device based on a future communication throughput predicted in the predicting;
acquiring band information to be used for communicating with the external device from the mobile communication network;
storing the communication throughput measured in the measuring and the band information acquired in the acquiring at a time when the communication throughput is measured, by association with each other; and
detecting at least one of a handover execution and a communication band switching,
wherein if at least one of a handover execution and a communication band switching has been detected, the controlling a communication rate comprises switching from controlling the communication rate based on the future communication throughput predicted in the predicting to controlling the communication rate based on information stored in the storing and the band information acquired in the acquiring.

20. An information processing method performed by an information processing apparatus, the information processing apparatus comprising a communication interface configured to communicate with an external device through a mobile communication network, the information processing method comprising:
measuring a communication throughput for communicating with the external device;
predicting a future communication throughput based on a communication throughput measured in the measuring;
controlling a communication rate for communicating with the external device based on the future communication throughput predicted in the predicting;
acquiring band information to be used for communicating with the external device from the mobile communication network;
storing the communication throughput measured in the measuring and band information acquired in the acquiring band information at a time when the communication throughput is measured, by association with each other; and
detecting at least one of a handover execution and a communication band switching,
wherein if at least one of a handover execution and a communication band switching has been detected, the controlling a communication rate comprises switching from controlling the communication rate based on a future communication throughput predicted in the predicting to controlling the communication rate based on information stored in the storing and the band information acquired in the acquiring band information.

* * * * *